United States Patent
Hahn

(10) Patent No.: US 7,319,300 B2
(45) Date of Patent: Jan. 15, 2008

(54) METHOD OF OPERATING AN ELECTRONICALLY COMMUTATED MOTOR, AND METHOD FOR CARRYING OUT SUCH A METHOD

(75) Inventor: Alexander Hahn, Sauldorf-Boll (DE)

(73) Assignee: ebm-Papst St. Georgen GmbH & Co KG, St. Georgen (DE)

( * ) Notice: Subject to any disclaimer, the term of this patent is extended or adjusted under 35 U.S.C. 154(b) by 59 days.

(21) Appl. No.: 11/420,213

(22) Filed: May 24, 2006

(65) Prior Publication Data

US 2006/0267531 A1    Nov. 30, 2006

(30) Foreign Application Priority Data

May 27, 2005    (DE) ....................... 10 2005 025 894

(51) Int. Cl.
 *H02P 1/18* (2006.01)
(52) U.S. Cl. ...................... 318/254; 318/138; 318/254
(58) Field of Classification Search ................ 318/138, 318/254, 459, 500, 439
See application file for complete search history.

(56) References Cited

U.S. PATENT DOCUMENTS 5,457,366 A * 10/1995 Wehberg et al. ............ 318/439
6,825,627 B2 * 11/2004 Berroth et al. .............. 318/439
2004/0041549 A1 * 3/2004 Halfman et al. ............ 323/282

* cited by examiner

*Primary Examiner*—Rina Duda
(74) *Attorney, Agent, or Firm*—Milton Oliver, Esq.; Ware Fressola Van Der Sluys & Adolphson LLP

(57) ABSTRACT

In this method, the value of a temperature-dependent motor parameter ($k_e$) of an electronically commutated motor (124) is determined during motor operation without a temperature sensor. The motor has a stator (201) having stator phases (202, 204, 206), and a permanent-magnet rotor (208) coacting with that stator, which rotor induces voltages ($U_{IND}$) in the stator phases during operation, a power stage (122) being associated with the stator phases in order to control their energization. In this method, energization of the stator phases is interrupted while the rotor (208) is rotating. A value ($U_{IND}$) characterizing an induced voltage, and a value ($\omega$) characterizing a rotation speed of the motor, are ascertained. On the basis of those values, the value of the temperature-dependent motor parameter ($k_e$) is derived. The invention also concerns a motor for carrying out such a method. The method requires no temperature sensor, and can be integrated into an "embedded program" such as the program otherwise needed for electronic commutation.

31 Claims, 10 Drawing Sheets

METHOD OF OPERATING AN ELECTRONICALLY COMMUTATED MOTOR, AND METHOD FOR CARRYING OUT SUCH A METHOD

CROSS-REFERENCE

This application claims priority from my German application DE 10 2005 025 894.8, filed 27 May 2005, the entire content of which is hereby incorporated by reference.

FIELD OF THE INVENTION

The invention relates to a method of, and an arrangement for, operating an electronically commutated motor (ECM) that has a permanent-magnet rotor.

BACKGROUND

When an ECM of this kind operates at different temperatures with the same constant current, the torque generated by the motor changes as a function of the temperature of the rotor magnet. Depending on the temperature range in which the motor must operate, and depending on magnet temperature, changes in torque of up to 44% are possible in this context, i.e. at a constant motor current, the torque generated at a magnet temperature of +180° C. is 44% lower than at a magnet temperature of -40° C. Suitable temperature compensation is advisable in order to counteract such large changes in torque. For this purpose, the instantaneous temperature of the rotor magnet must be known (directly or indirectly) so that the torque can be appropriately compensated, as a function of that temperature.

SUMMARY OF THE INVENTION

It is therefore an object of the invention to provide a new method for operating an electronically commutated motor, and a motor for carrying out such a method.

This object is achieved by interrupting current supply to the stator windings and, during this interruption, measuring the magnitude of the voltage induced in the windings by the continued rotation of the rotor, using this measured value to infer the value of the temperature of the rotor magnet, and resuming current supply to the windings. The basis of the invention is the recognition that especially in the case of smaller motors, a direct measurement of the magnet temperature would be too expensive, since such measurement requires a special temperature sensor which covers the range of magnet temperatures occurring during operation, and which must be connected, via an electrical connection inside the motor, to a corresponding electronic apparatus. The invention therefore proceeds from the idea of ascertaining the magnet temperature of an electronically commutated motor, using a motor parameter whose value changes as a function of the magnet temperature. The magnet temperature can then be inferred from the value of that parameter, so that a direct measurement of the magnet temperature (by means of a temperature sensor) is not necessary. The invention is not limited to a specific type of motor, but rather is suitable for many motor designs, for example motors having one stator winding phase, two phases, three phases, etc., and any number of rotor poles. It is equally suitable for internal-rotor motors and for external-rotor motors.

In the method, energy delivery to the stator phases of the ECM is briefly interrupted. After the motor current has decayed (i.e. when the motor has become substantially currentless) and the rotor continues to rotate, a value is ascertained for the voltage that is induced by the rotor magnet in at least one stator phase. A value that is characteristic of the motor rotation speed is also ascertained, if necessary. This value can be, for example, the rotation speed itself, or the time required for the rotor to travel through a predetermined rotation angle, or (in the case of a rotation-speed-regulated motor) the rotation speed target value commanded to the rotation speed regulator. From this ascertained voltage value and the rotation speed value, the temperature of the rotor magnet can be inferred and a corresponding numerical value can be obtained, if the latter value is in fact necessary for calculation.

A direct measurement of the magnet temperature by means of a special temperature measuring element can thus be dispensed with. The temperature-dependent motor parameter is determined during operation of the ECM, for example at predetermined time intervals depending on the type of drive system.

A preferred refinement of the method according to the present invention is to use the temperature-dependent motor parameter to raise or lower the current applied to the windings, in order to obtain the desired motor torque output, despite any temperature change. This allows the torque generated by the motor to be kept substantially constant regardless of the magnet temperature; this applies also in the context of manufacturing variances or tolerances among a series of motors, since the magnets used within a series can have different magnetic properties, as a result of variations, or deviations from intended values, in the manufacturing process, and these variations can also be, so to speak, "controlled out" with the aid of the invention, so that the purchaser receives a uniform product in which certain motor values can be guaranteed. This is important, for example, if such a motor is used to drive the sliding part of a valve, so that this valve can be closed with a torque that is independent of the ambient temperature. This is very advantageous especially in Arctic regions. It is also possible, however, to predetermine, as a function of temperature, a specific dependence of the torque on temperature.

A particularly preferred refinement of the invention is, in a 3-phase stator, to make conductive the semiconductor switch associated with just one phase, and to then measure induced voltage at a second winding terminal. In an ECM having three stator phases, i.e. a so-called three-phase motor, a full-bridge circuit is often used as the power stage. This circuit has three semiconductor series circuits, each having an upper and a lower semiconductor switch. For measurement, the semiconductor switches of the power stage are controlled so that energy delivery to the motor is interrupted. Then, when the motor current has decayed, a first lower semiconductor switch of a first series circuit, which circuit is connected to a first winding terminal, is made conductive; and at a second winding terminal that is connected via a stator phase to the first winding terminal, the voltage induced in that stator phase is sensed or measured.

If necessary, the relevant rotation speed value can very easily be ascertained, using rotor position output signals of a rotor position sensor that is associated with that motor.

A method according to the present invention can thus be carried out using simple components that are, at least in part, already present in common ECMs. This facilitates inexpensive implementation.

A further preferred refinement is to measure, during a currentless state of the stator winding, not only the voltage induced by turning of the rotor, but also the rotation speed, and to use both these factors in deriving the value of the temperature-depeedent motor parameter. The temperature-dependent motor parameter derived here is the so-called "motor constant" $k_e$, or a value proportional to it, which describes the voltage induced in a stator phase of the motor at a specific standard rotation speed. As the temperature of the rotor magnet rises, the value of this motor constant drops. From its value, the magnet temperature can therefore be directly inferred; and, from its value, it is also possible to draw conclusions as to deviations of a motor from the average of a series of motors, and then to compensate electronically for those deviations.

BRIEF FIGURE DESCRIPTION

Further details and advantageous refinements of the invention are evident from the exemplifying embodiments, in no way to be understood as a limitation of the invention, that are described below and depicted in the drawings. In the drawings.

DETAILED DESCRIPTION

Figure 1:
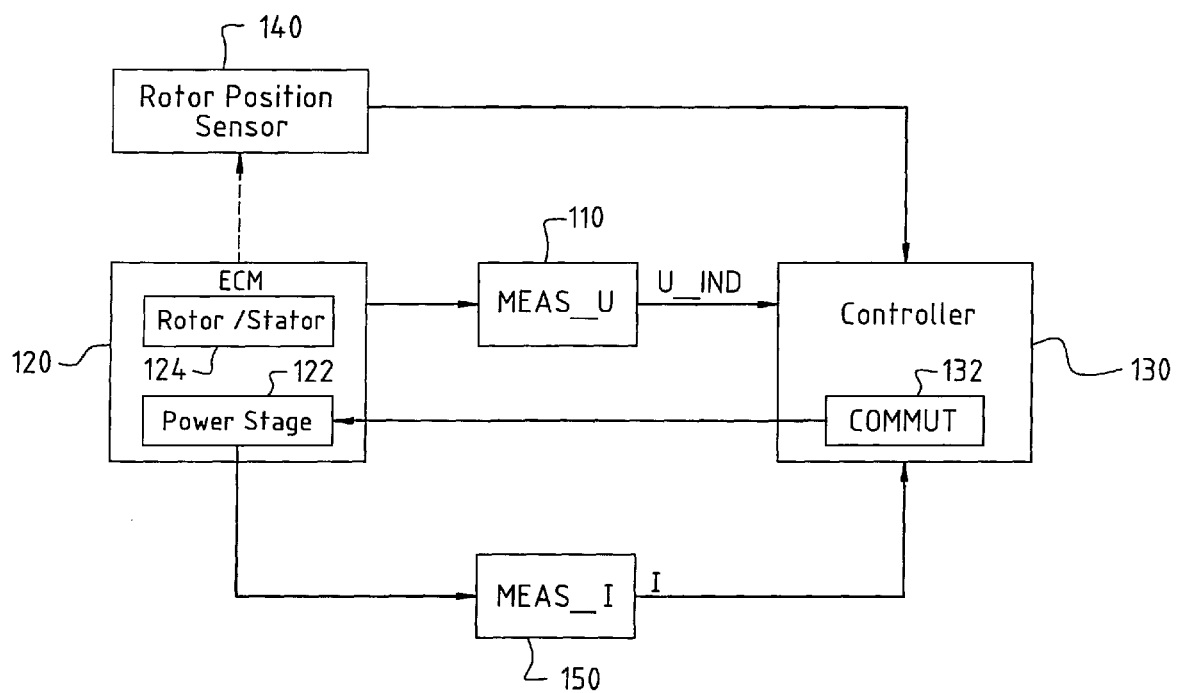
FIG. 1 is a block diagram of an apparatus for determining a temperature-dependent motor parameter for an ECM according to the invention.

FIG. 1 is a block diagram illustrating, in principle, the functioning of an apparatus 100 for operating an ECM 120 according to the present invention. Apparatus 100 is implemented for ascertaining a temperature-dependent motor parameter of ECM 120, which parameter can be used to determine the magnet temperature of ECM 120. The torque of ECM 120 can be regulated as a function of the magnet temperature in order to compensate for torque fluctuations occurring as a result of variations in magnet temperature.

According to an embodiment of the present invention, apparatus 100 encompasses an ECM 120 having a rotor-stator arrangement 124 having a rotor and at least one stator phase. Associated with ECM 120 is a power stage 122 for influencing the motor current in the at least one stator phase. Apparatus 100 encompasses a controller 130 that is connected to ECM 120. Controller 130 encompasses a commutation controller 132 (COMMUT), and is connected on the input side to at least one rotor position sensor 140 that is associated with ECM 120. As a function of rotor position signals that are generated by rotor position sensor 140, commutation controller 132 generates commutation signals for power stage 122 of ECM 120. Power stage 122 is connected on the output side to controller 130, via a current measuring element 150 (MEAS_I) for measuring the motor current. Controller 130 is connected on the input side to a voltage measuring element 110 (MEAS_U) for measuring a voltage induced in the at least one stator phase. Controller 130 is preferably configured to influence, as a function of the magnet temperature of the rotor of arrangement 124, the commutation signals furnished by commutation controller 132 for power stage 122 of ECM 120.

When apparatus 100 is in operation, a supply voltage is delivered to the at least one stator phase of arrangement 124 of ECM 120, and is converted by ECM 120 into rotations of the rotor at a specific rotation speed. The currents flowing through the at least one stator phase are controlled by commutation controller 132 by means of commutation signals.

For determination of the temperature-dependent motor parameter, power stage 122 is switched off so that the at least one stator phase of arrangement 124 transitions into a currentless state, since the voltage induced in the stator winding is measurable only in the currentless state. As depicted in FIG. 1, the motor current I can be measured with current measuring element 150 after power stage 122 is switched off, in order to determine the point in time of the transition into the currentless state.

Once the currentless state has been reached, a rotation speed value $\omega$ is determined by controller 130 in a predetermined measurement period. As depicted in FIG. 1, the rotation speed value $\omega$ can be ascertained using signals of rotor position sensor 140. For example, in order to determine the rotation speed value $\omega$, a measurement is made of the time needed for the rotor of ECM 120 to rotate from a first to a second position, in which context the first and the second position can be determined using the signal of sensor 140. The first and second positions can furthermore be detected by a change in the rotor position signal.

At least one voltage value $U_{IND}$ for the voltage induced in the stator phase is delivered by voltage measuring element 110 to controller 130 during the measurement period. A measurement period preferably begins upon a change in the signal from rotor position sensor 140.

From the at least one voltage value $U_{IND}$ and the rotation speed value $\omega$, controller 130 determines the temperature-dependent motor parameter. The manner in which apparatus 100 functions in order to determine the temperature-dependent motor parameter is described in more detail with reference to FIG. 2.

The temperature-dependent motor parameter allows a direct inference of the magnet temperature in ECM 120. The parameter is ascertained while ECM 120 is rotating.

Figure 2:
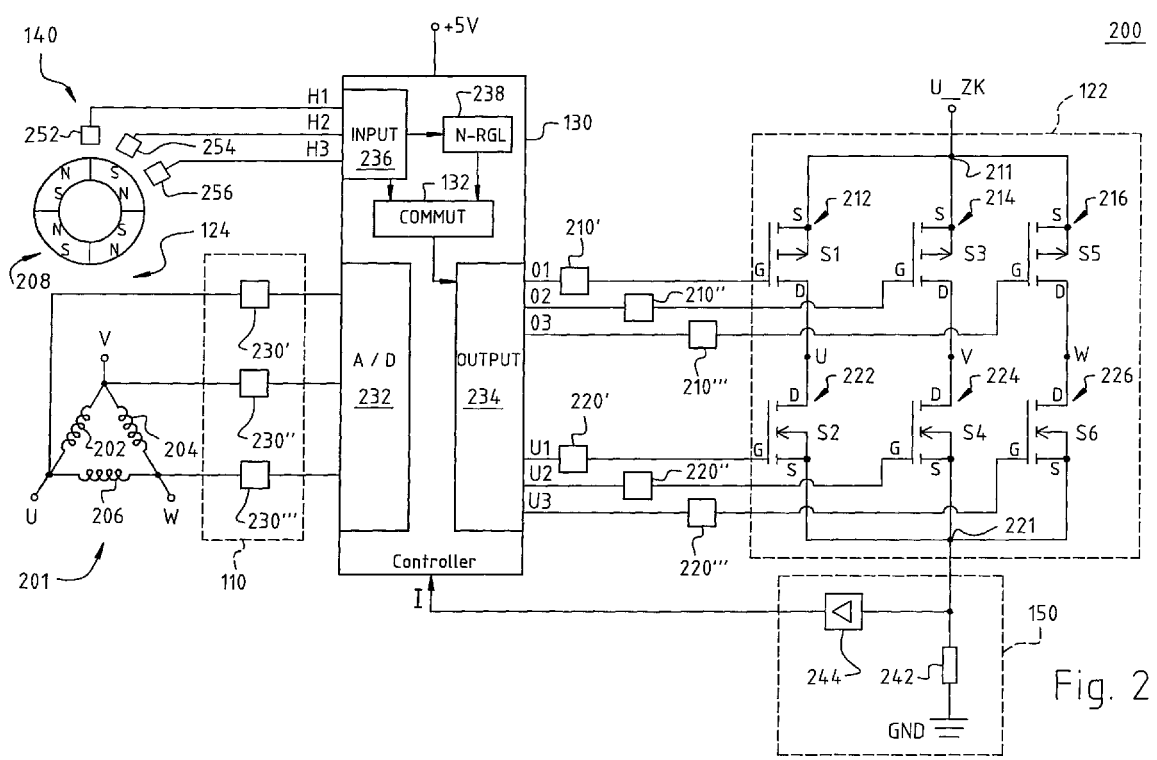
FIG. 2 is a circuit diagram of an apparatus for determining a temperature-dependent motor parameter for an ECM according to an embodiment of the invention.

FIG. 2 is a simplified circuit diagram of a circuit 200, for determining a temperature-dependent motor parameter, with which circuit apparatus 100 for operating ECM 120 of FIG. 1 is implemented according to a first embodiment. This circuit encompasses a plurality of components that implement arrangement 124 and power stage 122 of ECM 120, the at least one rotor position sensor 140, controller 130 with commutation controller 132, current measuring element 150, and voltage measuring element 110.

Arrangement 124 of ECM 120 is depicted here schematically by a rotor 208 and a stator 201. Rotor 208 is depicted, by way of example, as a permanent-magnet rotor having four magnet poles. Alternatively, rotor 208 can be excited by the delivery of current, so that permanent magnets can be omitted. Stator 201 is depicted, by way of example, with three phases 202, 204, 206 that, as shown in FIG. 2, are connected in delta form. A Y-configured circuit, separate control of each phase, or a different number of phases are likewise possible. Associated with each of phases 202, 204, and 206 is a respective terminal U, V, and W through which the phases are connected to power stage 122.

Each of terminals U, V, W of stator phases 202, 204, and 206 is connected, via an associated signal conditioning device 230', 230", and 230''', to an A/D converter 232 (A/D) of controller 130. Signal conditioning devices 230', 230", and 230''' constitute voltage measuring element 110, and are described with reference to FIG. 5.

Terminal U of phase 202 is connected to a first upper semiconductor switch 212 (S1) and to a first lower semiconductor switch 222 (S2) of power stage 122, which switches constitute a first semiconductor series circuit. Terminal V of phase 204 is connected to a second upper semiconductor switch 214 (S3) and to a second lower semiconductor switch 224 (S4) of power stage 122, which switches constitute a second series circuit. Terminal W of phase 206 is connected to a third upper semiconductor switch 216 (S5) and to a third lower semiconductor switch 226 (S6) of power stage 122, which switches constitute a third series circuit. The first, second, and third series circuits constitute power stage 122.

Upper and lower semiconductor switches 212, 214, 216, 222, 224, and 226 are preferably implemented using MOSFETs (Metal Oxide Semiconductor Field Effect Transistors) or IGBTs (isolated gate bipolar transistors), which have integrated free-wheeling or "recovery" diodes, whose conducting voltage is generally between 0.7 and 1.4 V. In FIG. 2, upper semiconductor switches 212, 214, and 216 are implemented as P-channel MOSFETS, and lower semiconductor switches 222, 224, and 226 as N-channel MOSFETs, terminals U, V, and W being respectively connected to drains D of the associated lower and upper MOSFETs. The gates of the upper and lower MOSFETs are connected via signal conditioning devices to an output device 234 (OUTPUT) of controller 130, which device is connected to commutation controller 132 of controller 130 in order to deliver to power stage 122 the commutation signals generated by commutation controller 132. For this purpose, each gate of upper MOSFETs 212, 214, and 216 is connected, via a respective signal conditioning device 210', 210", and 210''' associated with the MOSFET, to a corresponding output O1, O2, and O3 of output device 234. Signal conditioning devices 210', 210", and 210''' are described with reference to FIG. 4. Each gate of one of lower MOSFETs 222, 224, 226 is connected, via a respective signal conditioning device 220', 220", and 220''' associated with the MOSFET, to an associated output U1, U2, and U3 of output device 234. Signal conditioning devices 220', 220", and 220''' are described further with reference to FIG. 3. The source terminals of upper MOSFETs 212, 214, and 216 are connected to a supply voltage $U_{ZK}$ via a node 211. The source terminals of lower MOSFETs 222, 224, and 226 are connected to one another via a base node 221. The latter is connected via a base node resistor 242 to ground (GND). Base node 221 and base node resistor 242 are moreover connected via an amplifier 244 to controller 130. Base node resistor 242 and amplifier 244 constitute current measuring element 150.

Controller 130, which is preferably implemented as a microprocessor or microcontroller, is connected via an input device 236 (INPUT) to rotor position sensor 140, which latter is implemented, by way of example, using three Hall sensors 252, 254, and 256. As FIG. 2 shows, Hall sensor 252 is connected to an input H1 of input device 236. Hall sensor 254 is connected to an input H2 of input device 236, and is arranged at an offset of 60° el. with respect to Hall sensor 252. Hall sensor 256 is connected to an input H3 of input device 236, and is arranged at an offset of 60° el. with respect to Hall sensor 254 and at an offset of 120° el. with respect to Hall sensor 252.

Input device 236 is connected to commutation controller 132 and to a rotation speed regulator 238 (N-RGL). The latter is likewise connected to commutation controller 132.

When apparatus 200 is in operation, supply voltage $U_{ZK}$ is applied to power stage 122 in order to energize stator 201. Voltage $U_{ZK}$ is preferably a substantially constant DC voltage, which is furnished by a power supply or a battery and causes a rotation of rotor 208. The Hall signals of Hall sensors 252, 254, 256 resulting in this context are delivered to rotation speed regulator 238, which determines, from the Hall signals, a rotation speed actual value of rotor 208. Rotation speed regulator 238 uses the rotation speed actual value to generate a rotation speed controlled variable that is applied to commutation controller 132.

As a function of the rotation speed controlled variable and rotor position signals H1, H2, H3, commutation controller 132 generates commutation signals for controlling power stage 122, which signals are delivered via output device 234 to the gates of the upper and lower MOSFETs. The commutation signals can have corresponding pulse width modulation (PWM) signals overlaid on them for controlling the MOSFETs, so that by the use of these MOSFETs, the currents flowing through stator phases 202, 204, and 206 are controlled in order to generate a rotating magnetic field to drive rotor 208. The motor currents are commutated, for example, in such a way that rotor 208 rotates at a predetermined target rotation speed (n_s). For commutation of the motor currents, the upper and lower MOSFETs are switched on or off as necessary by corresponding commutation signals or superimposed PWM signals, with the result that stator phases 202, 204, and 206 associated with the MOSFETs are likewise correspondingly switched on or off.

At a predetermined point in time, controller 130 carries out a determination of the temperature-dependent motor parameter. For this purpose, it first switches power stage 122 off, so that stator 201 transitions into a currentless state in order to enable determination of the temperature-dependent motor parameter.

Preferably all the upper and lower MOSFETs 212, 214, 216, 222, 224, and 226, but at least upper MOSFETs 212, 214, and 216, are made non-conductive. Since no further current can therefore flow into stator phases 202, 204, and 206, the motor current in stator 201 decays; the point in time of the transition into the currentless state can be determined by a current measurement at base node resistor 242.

A voltage is picked off for this purpose at base node resistor 242, i.e. at node 221; this voltage is dependent on the motor current after the deactivation of power stage 122, and is amplified by amplification circuit 244 to yield an actual motor current value I that is fed back to controller 130. When this current I has decayed, stator 201 is currentless. As an alternative to a measurement at resistor 242, the current could also be measured directly at stator phases 202, 204, 206, for example using suitable LEM modules. Alternatively, it is possible to wait a predetermined amount of time after the deactivation of power stage 122 to allow the motor current to decay.

Figure 6:
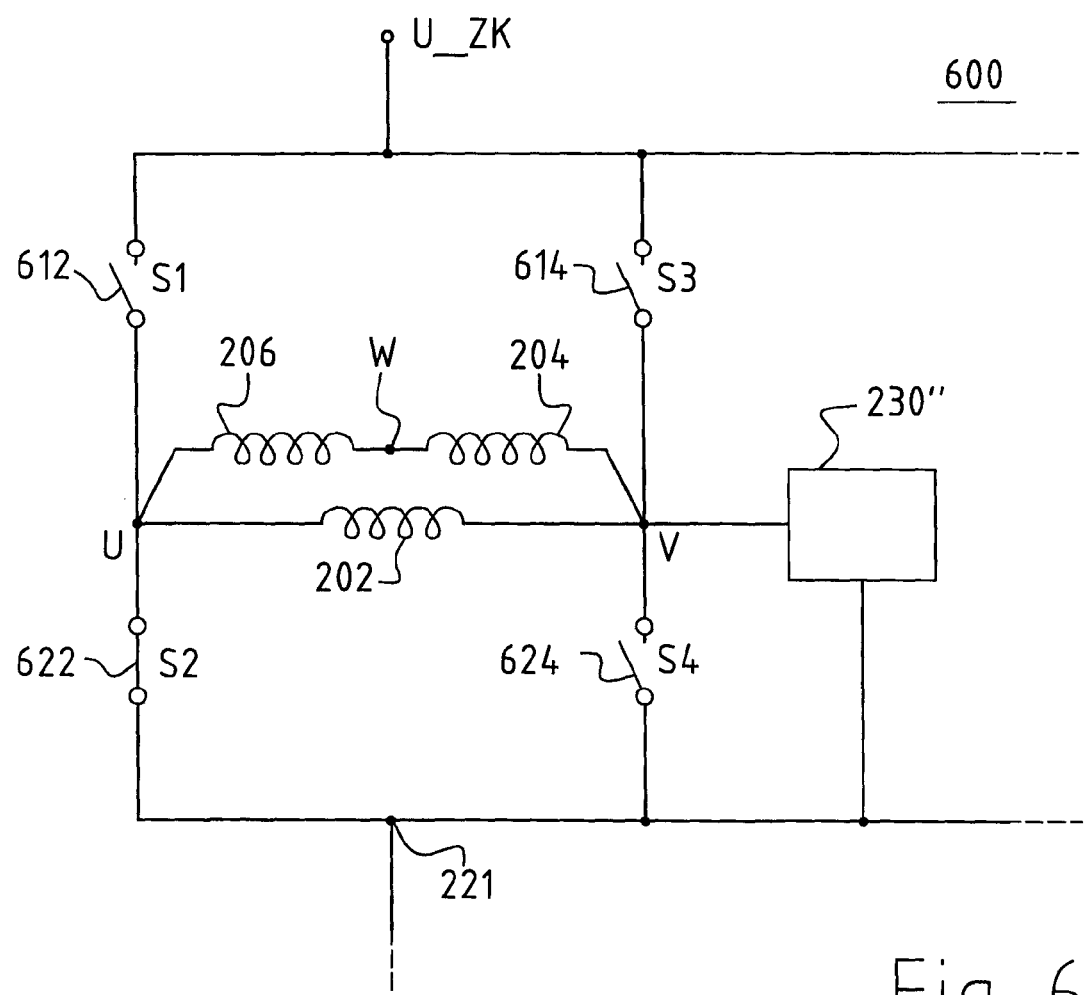
FIG. 6 is a simplified circuit diagram of a measuring element for measuring a voltage induced in a stator phase according to an embodiment of the invention.

To allow measurement of the value characterizing the induced voltage via signal conditioning devices 230', 230", and 230'" during the measurement period, one of the lower MOSFETs 222, 224, and 226 of power stage 122 is respectively switched on as a function of the position of rotor 208 (which position is determined by means of Hall sensors 252, 254, and 256), as described further with reference to FIG. 6. Controller 130 thus has delivered to it during the measurement period, from signal conditioning devices 230', 230", and 230'" via A/D converter 232, at least one voltage value $U_{IND}$ for the voltage induced in stator phases 202, 204, and 206.

Alternatively, a plurality of voltage measurements can be carried out during the measurement period, so that a plurality of voltage values are delivered to controller 130. In this case, controller 130 determines the voltage value $U_{IND}$ by averaging over all the voltage values delivered to it during the measurement period.

The value ω characterizing the rotation speed of the motor is likewise determined by controller 130. For this, the time between two changes of the rotor position signal is measured. The measurement can be performed during the measurement period for the induced voltage, or also before or after it, provided the rotation speed is fairly constant. Be it noted, however, that the use of Hall sensors is merely one possible embodiment for determining the rotor position, and that a variety of other measurement methods can be used instead, for example a measurement by means of sine and cosine transducers or absolute-value transducers, or a non-contact measurement by means of counter-EMF, or an inductance measurement.

In the case of a motor having a rotation speed regulator and consequently a rotation speed target value n_s, the rotation speed target value can also be used for the value characterizing the rotation speed. The deviation of the rotation speed from the rotation speed target value is in this case dependent on the length of the measurement period, the decrease in the rotation speed being less, the shorter the length selected for the measurement period. A longer measurement period can, however, be desirable in order to increase measurement accuracy.

From the at least one voltage value $U_{IND}$ and the rotation speed value ω, controller 130 determines the temperature-dependent motor parameter. According to a preferred embodiment of the present invention, the temperature-dependent motor parameter is motor constant $k_e$, which is calculated from the at least one voltage value $U_{IND}$ and the rotation speed omega ω according to the equation $$k_e = U_{IND}/\omega \quad (1).$$

The motor constant $k_e$ allows the magnet temperature of ECM 120 to be inferred directly. For an ECM 120 of a specific design, for example, the motor constant $k_e$ can decrease by 0.2% per ° C. as the magnet temperature rises. If a nominal value $k_{eNOM}$ for the motor constant $k_e$ at a baseline magnet temperature of, for example, +25° C. is known for a given motor, an instantaneous magnet temperature of the relevant motor can thus be inferred directly from an ascertained motor constant $k_e$.

The motor constant $k_e$ is preferably used to influence the commutation signals of commutation controller 132; these signals then serve to control power stage 122, as a function of the instantaneous magnet temperature, in such a way that improved torque regulation of ECM 120 is achieved. This regulation allows torque fluctuations resulting from changes in the magnet temperature to be compensated for. For example, rotation speed regulator 238 can determine from the motor constant $k_e$ and the nominal value $k_{eNOM}$ of the motor constant, in accordance with the equation $$Cf = k_e/k_{eNOM} \quad (2),$$

a correction factor Cf that is suitable for correcting the motor current as a function of the magnet temperature of ECM 120. Correction of the motor current as a function of the magnet temperature of ECM 120 causes the latter's torque to be regulated as a function of the magnet temperature, in order to compensate for temperature fluctuations.

This torque regulation can be improved by using, for the motor constant $k_e$ of a given motor at the baseline magnet temperature, not the actual value of motor constant $k_e$ but rather a corresponding target value that is predetermined by the manufacturer for a series of such motors. Manufacturing variations within the relevant series can thus once again be compensated for, by referring back to the predetermined target value in the context of the temperature-dependent torque regulation according to the present invention.

Situations in which a maximum torque must not be exceeded are a preferred application. The torque depends on the motor current and on temperature. By measuring the temperature by means of the present arrangement, it is possible to determine, for the respective temperature, a maximum current I that corresponds to the maximum torque and that must not be exceeded. This then allows a higher maximum current at higher temperatures, without exceeding the maximum torque. This results in motors that react well even at higher temperatures.

Figure 3:
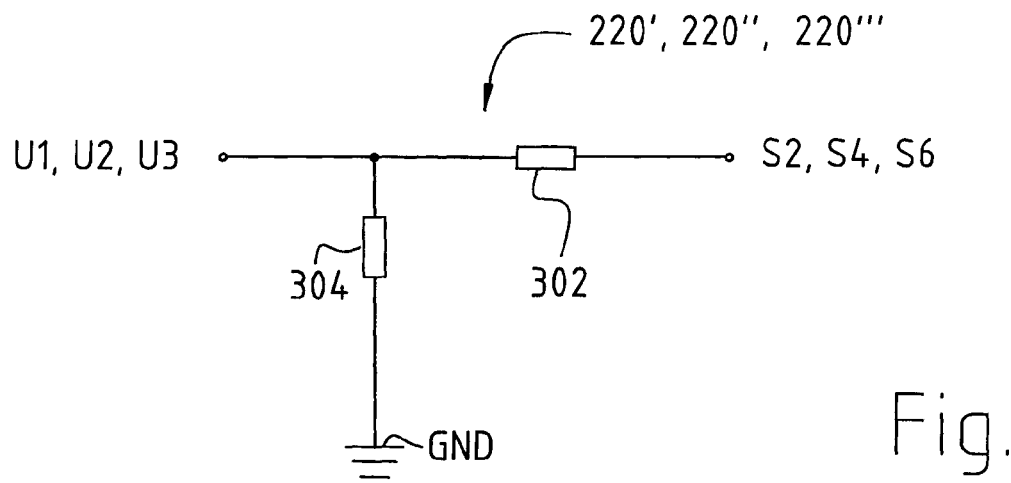
FIG. 3 is a circuit diagram of a signal conditioning device for a control signal for a lower semiconductor switch in a power stage according to an embodiment of the invention.

FIG. 3 is a simplified circuit diagram of an example of a circuit with which each of signal conditioning devices 220', 220", and 220'" of FIG. 2 is implemented. Each of outputs U1, U2, and U3 of circuit 200 is connected on the one hand via a resistor 304 to ground (GND), and on the other hand via a resistor 302 to the gate of the associated lower MOSFET S2, S4, or S6. Resistor 302 serves as a current limiting resistor in order to protect the associated gate from overload, while resistor 304 serves to generate a corresponding switch-on or switch-off potential at the associated gate.

Figure 4:
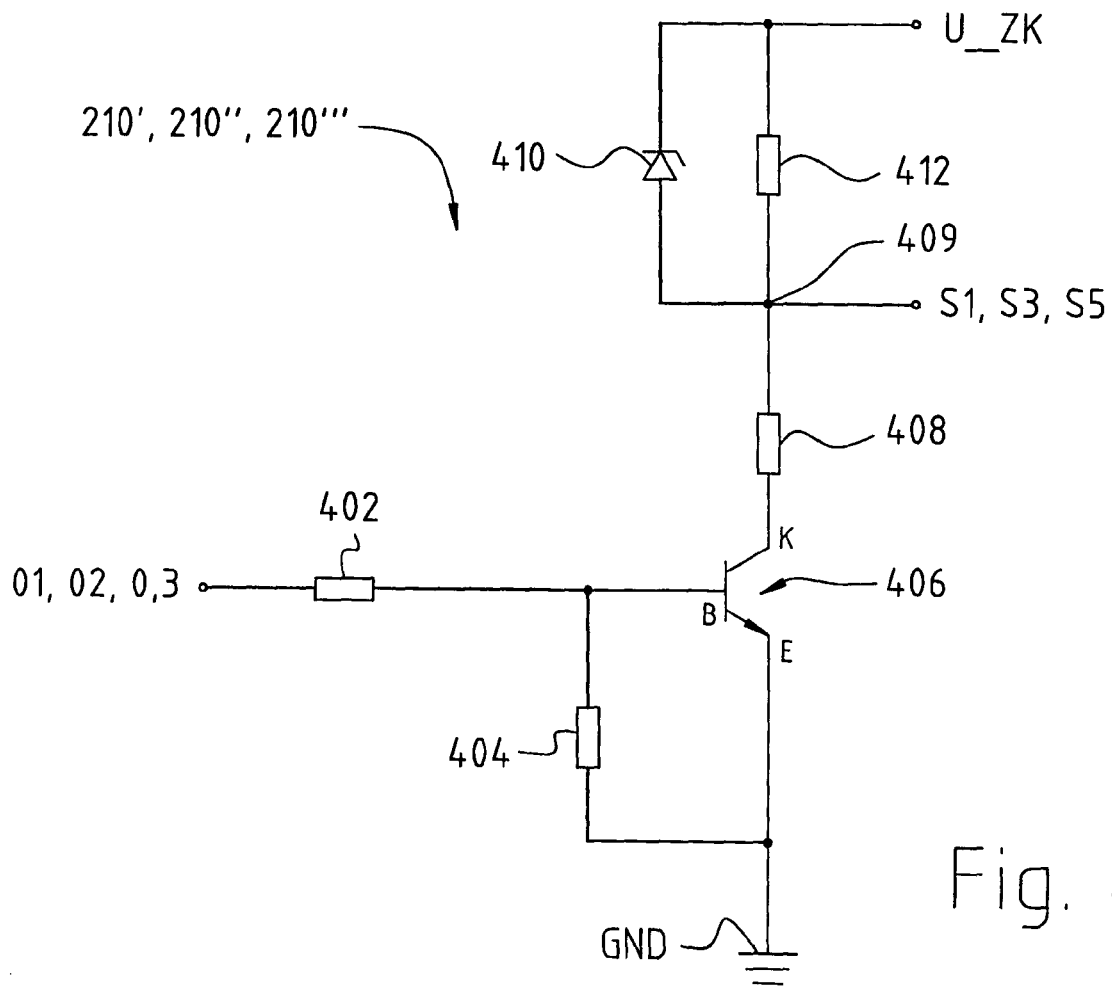
FIG. 4 is a circuit diagram of a signal conditioning device for a control signal for an upper semiconductor switch in a power stage according to an embodiment of the invention.

FIG. 4 is a simplified circuit diagram of a circuit with which each of signal conditioning devices 210', 210", and 210'" of FIG. 2 is implemented according to a preferred embodiment of the invention. Each of outputs O1, O2, and O3 of circuit 200 of FIG. 2 is connected via a resistor 402 to the base of an NPN transistor 406 whose emitter is connected to ground (GND). The base of transistor 406 is also connected via a resistor 404 to ground. Its collector is connected via a resistor 408 to a node 409 that is connected, via a parallel circuit of a Zener diode 410 with a resistor 412, to supply voltage $U_{ZK}$. Node 409 is furthermore connected to the gate of the associated upper MOSFET S1, S3, or S5.

Signal conditioning devices 210', 210", and 210''' serve for potential conversion, in order to convert the potential of supply voltage $U_{ZK}$ and the potential at the corresponding output O1, O2, or O3 into a switching potential for making the associated upper P-channel MOSFETs S1, S3, or S5 conductive or non-conductive. Transistor 406 is made conductive when the signal at the corresponding output O1, O2, or O3 is "high," i.e. when the potential at O1, O2, or O3 has, for example, a level of +5 V. When transistor 406 is conductive, resistors 408 and 412 constitute a voltage divider, so that the switching potential for the respective upper MOSFET S1, S3, or S5 is formed at node 409. When transistor 406 is non-conductive, what occurs at node 409 is the potential of supply voltage $U_{ZK}$, which causes blockage of the respective upper MOSFET S1, S3, or S5.

Figure 5:
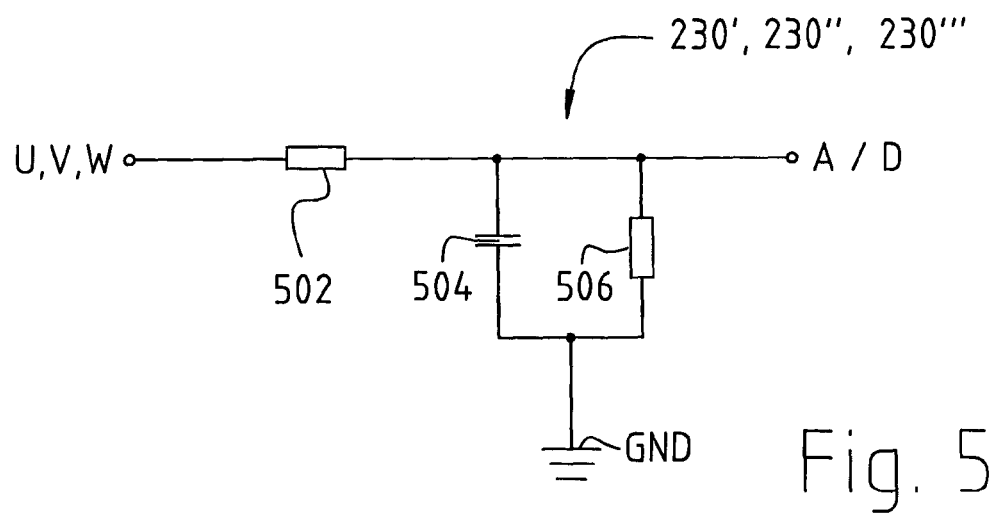
FIG. 5 is a circuit diagram of a signal conditioning device for a voltage induced in a stator phase according to an embodiment of the invention.

FIG. 5 is a simplified circuit diagram of a circuit with which each of signal conditioning devices 230', 230", and 230''' of FIG. 2 is preferably implemented. Each terminal U, V, W of phases 202, 204, and 206 of circuit 200 is connected via a resistor 502 to a corresponding terminal of A/D converter 232. The corresponding terminal of the A/D converter is furthermore connected to ground (GND) via a parallel circuit of a capacitor 504 and a resistor 506. Resistor 502 serves in this context as a current limiting resistor in order to protect the respective terminal of the A/D converter from overload. The parallel circuit of capacitor 504 with resistor 506 constitutes an RC filter to smooth the measured signal (low-pass).

FIG. 6 is a simplified circuit diagram of a circuit 600 that represents a switching state of a portion of power stage 122 (FIG. 2) during a measurement of the induced voltage in stator phases 202, 204, 206. The induced voltage is measured, at a respectively selected stator phase, as a function of an instantaneous position of rotor 208, the stator phase to be used being determined from a table, such as the one depicted below by way of example.

TABLE 1

| | H3 | H2 | H1 | W | V | U |
|---|---|---|---|---|---|---|
| 000: | | | | | | |
| 001: | 0 | 0 | 1 | M | — | E |
| 002: | 0 | 1 | 1 | M | E | — |
| 003: | 0 | 1 | 0 | — | E | M |
| 004: | 1 | 1 | 0 | E | — | M |
| 005: | 1 | 0 | 0 | E | M | — |
| 006: | 1 | 0 | 1 | — | M | E |

In lines 001 to 003, Table 1 describes possible combinations of Hall signals H3, H2, H1 that are delivered by Hall sensors 252, 254, and 256 to inputs H1, H2, and H3 of input device 236 (FIG. 2). Each combination represents a different rotor position of rotor 208. The combination in line 001, for example, describes a rotor position in which H1=1, H2=0, and H3=0. The last three columns indicate at which winding terminal (U. V, or W) the corresponding lower MOSFET 222, 224, or 226 is switched on (E), causing that winding terminal to be connected to terminal 221; and indicate the other winding terminal W at which the induced voltage is simultaneously measured (M). In the rotor position described in line 001, for example, lower MOSFET 222 is switched on (at winding terminal U), and the induced voltage is measured at winding terminal W, i.e. in stator phase 206. (This table applies to a predetermined rotation direction. For the opposite rotation direction, M and E are transposed.)

FIG. 6 illustrates only the first and second semiconductor series circuits of power stage 122 (FIG. 2) having MOSFETs 212, 214, 222, and 224 and winding terminals U and V, the MOSFETs being depicted, for illustration, as (semiconductor) switches 612, 614, 622, and 624. Connected in parallel with phase 202 here is the series circuit of phases 204, 206, whose connecting point W, in this rotor position, is connected neither to terminal 221 nor to $U_{ZK}$, so that the same voltage $U_{IND}$ is induced by rotor 208 in this series circuit as in phase 202.

FIG. 6 depicts, for elucidation purposes, an instance in which the rotor position of rotor 208 is such that the combination of Hall signals according to line 006 of Table 1 is produced, i.e. Hall signals H1=1 and H3=1 are delivered to inputs H1 and H3. According to line 006, lower semiconductor switch 622, which is connected to winding terminal U, is correspondingly made conductive. At winding terminal V, which is connected via stator phase 202 to winding terminal U, line 006 indicates that the voltage induced in stator phase 202 is measured with respect to ground (GND) via the corresponding signal conditioning device 230" of voltage measuring element 110.

When the rotor position signals according to line 006 of Table 1 are present during normal motor operation, the two semiconductor switches 614 and 622 are switched on in order to bring about energization of stator phase 202 and of the series-connected stator phases 204, 206. During measurement of the induced voltage, on the other hand, semiconductor switch 614 is made non-conductive in order to enable a measurement of the induced voltage.

Figure 7:
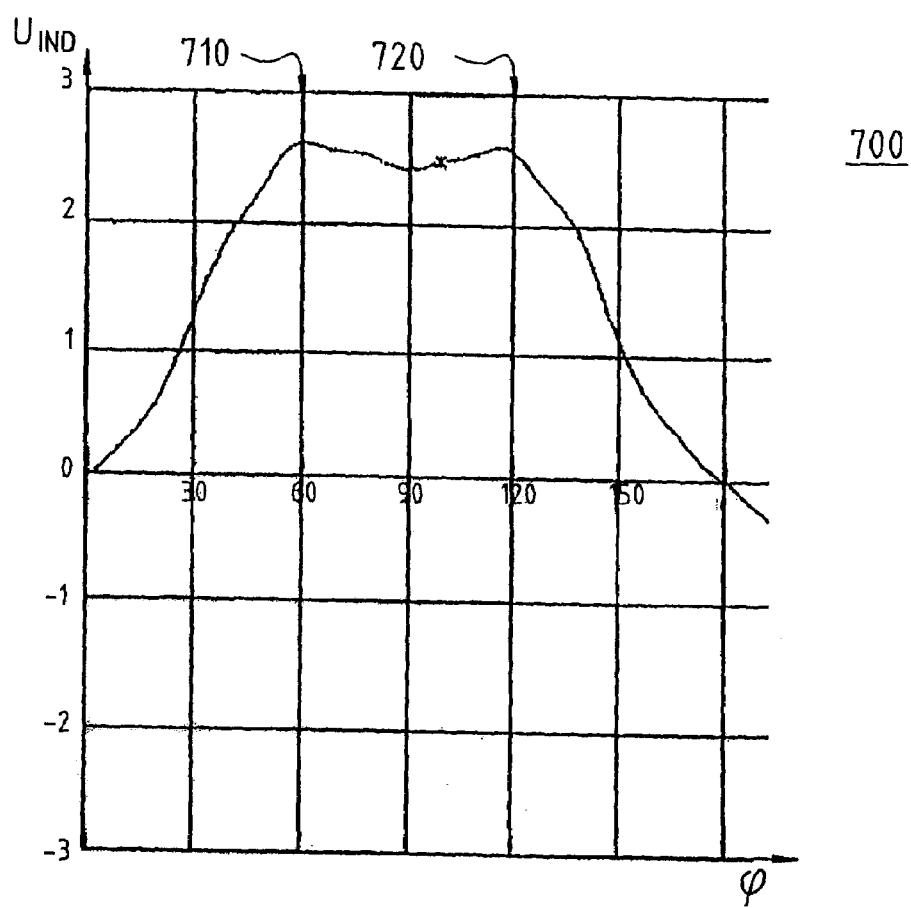
FIG. 7 is an oscillogram of a voltage induced in a stator phase during one measurement period, in an embodiment of the invention.

FIG. 7 is a schematic depiction 700 of an example of a curve for the induced voltage $U_{IND}$ that is measured in stator phase 202 with the circuit according to FIG. 6. In FIG. 7, the induced voltage $U_{IND}$ is shown as a function of a rotation angle φ of the rotor, which angle represents the rotor position and is depicted here over a rotation angle range of 180° el.

A first change in the rotor position signal (hereinafter referred to as a Hall change) takes place at a rotation angle 710 of φ=60° el. A second Hall change takes place at a rotation angle 720 of φ=120° el. At first Hall change 710, the exact position of the rotor is known, and the measurement period for measuring the induced voltage $U_{IND}$ begins. At second Hall change 720, the exact position of the rotor is likewise known, and the measurement period for measuring the induced voltage $U_{IND}$ preferably ends; that voltage is measured at least once, at the latest here, in this measurement period. During the measurement period between rotational positions 710 and 720, the potential that is measured at the winding terminal used for measurement corresponds approximately to the value of the maximum induced voltage. Before point 710 and after point 720, however, a measurement at the winding terminal is almost or entirely impossible. If a measurement is to be performed before point 710 or after point 720, this must be accomplished via a different winding terminal, as shown in Table 1.

Figure 8:
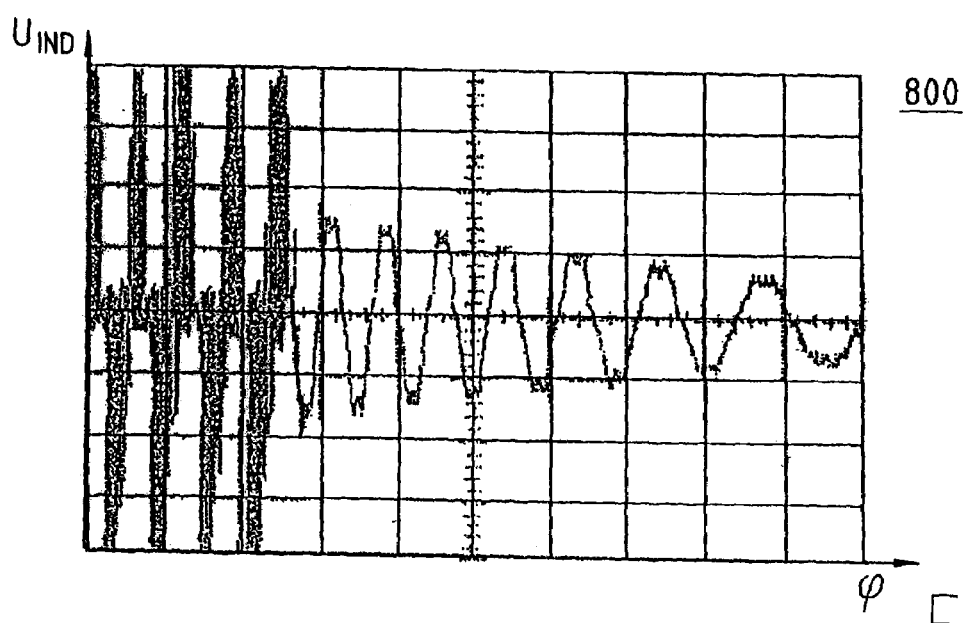
FIG. 8 is an oscillogram of a voltage induced in a stator phase during multiple successive measurement periods, in an embodiment of the invention.

FIG. 8 shows a schematic depiction 800 of an example of a curve for the induced voltage $U_{IND}$ that is measured with the circuit according to FIG. 6 at winding terminal V. In FIG. 8, the induced voltage $U_{IND}$ is depicted as a function of a rotation angle φ of the rotor, which angle represents the rotor position and encompasses, by way of example, a plurality of complete mechanical revolutions of the rotor.

As FIG. 8 shows, the induced voltage $U_{IND}$ decays if the measurement period is too long, so that the measurement accuracy declines. This decay is caused by the fact that the ECM is not energized during the entire measurement period, so that its rotation speed, and likewise the induced voltage $U_{IND}$, drops or decays. To prevent this, short measurement periods of, for example, 300 microseconds, or a maximum of 60° el. (cf. FIG. 7), are preferably chosen. Short measurement periods also have the advantage that the power output of the ECM is only insignificantly reduced by the measurement.

Figure 9:
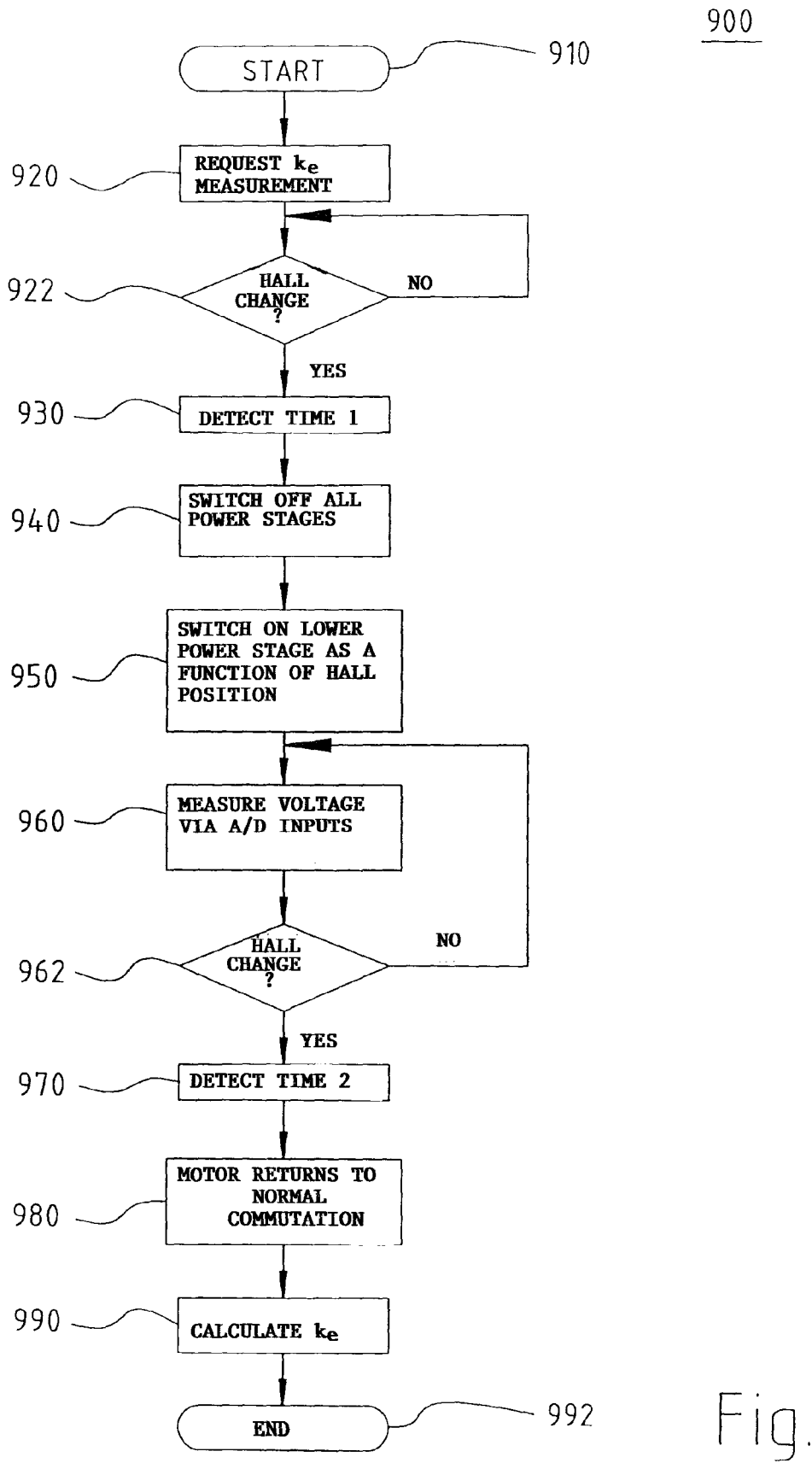
FIG. 9 is a flow chart of a method according to the present invention for determining a temperature-dependent motor parameter, according to an embodiment of the invention.

FIG. 9 shows a preferred flow chart of a method 900 for determining a temperature-dependent motor parameter, which method is carried out with circuit 200 of FIG. 2. Method 900 is described, for illustrative purposes, with reference to a determination of the motor constant $k_e$ by means of said circuit 200, and begins with step 910.

In step 920, firstly a $k_e$ determination is requested. This can be accomplished, for example, at a predetermined point in time by controller 130, which switches off power stage 122 so that stator 201 transitions into the currentless state in order to enable the determination of $k_e$. The request for a $k_e$ determination is repeated at predetermined time intervals that are defined as a function of a possible change in magnet temperature. Such requests can be made at points in time during which no particular torque demands are present, for example when the ECM is running in reverse, or upon motor startup.

In step 922, execution waits for a Hall change of Hall sensors 252, 254, or 256, since at a Hall change the exact position of rotor 208 is known, and the measurement period for measuring an induced voltage $U_{IND}$ can thus preferably be initiated. When a corresponding first Hall change occurs, method 900 moves on to step 930. In step 930, the point in time at which the first Hall change occurs is determined.

In step 940, power stage 122 is switched off, i.e. all the upper and lower MOSFETs 212, 214, 216, 222, 224, and 226 are made non-conductive so that no further driving current flows in stator phases 202, 204, and 206. After power stage 122 is switched off, execution waits until the motor current in stator 201 has decayed, i.e. until stator 201 has become currentless.

In step 950, once the currentless state has been attained, one of the lower MOSFETs 222, 224, 226 is switched on as a function of the position of rotor 208, as described above with reference to FIG. 6. In step 960, the voltage value $U_{IND}$ for the voltage induced in stator phases 202, 204, 206 is delivered from signal conditioning devices 230', 230", and 230'" via A/D converter 232 to controller 130.

In step 962, execution waits for a second Hall change of Hall sensors 252, 254, or 256, since here once again the exact position of rotor 208 is known, and the measurement period for measuring the induced voltage $U_{IND}$ can thus be ended. When a corresponding second Hall change occurs, method 900 moves on to step 970. In step 970, the point in time at which the second Hall change occurs is determined.

In step 980, stator 201 is once again energized normally using the commutation signals generated by commutation controller 132, in order to return to normal operation.

In step 990, the motor constant $k_e$ is determined. For this, firstly the rotation speed value omega ($\omega$) is determined, from the known positions of rotor 208 at the first and the second Hall change, and from the measured point in time of the first Hall change and the measured point in time of the second Hall change. From the voltage value $U_{IND}$ and the rotation speed value $\omega$, controller 130 then derives the value of the motor constant $k_e$ as described above. Method 900 then ends at step 992.

Figure 11:
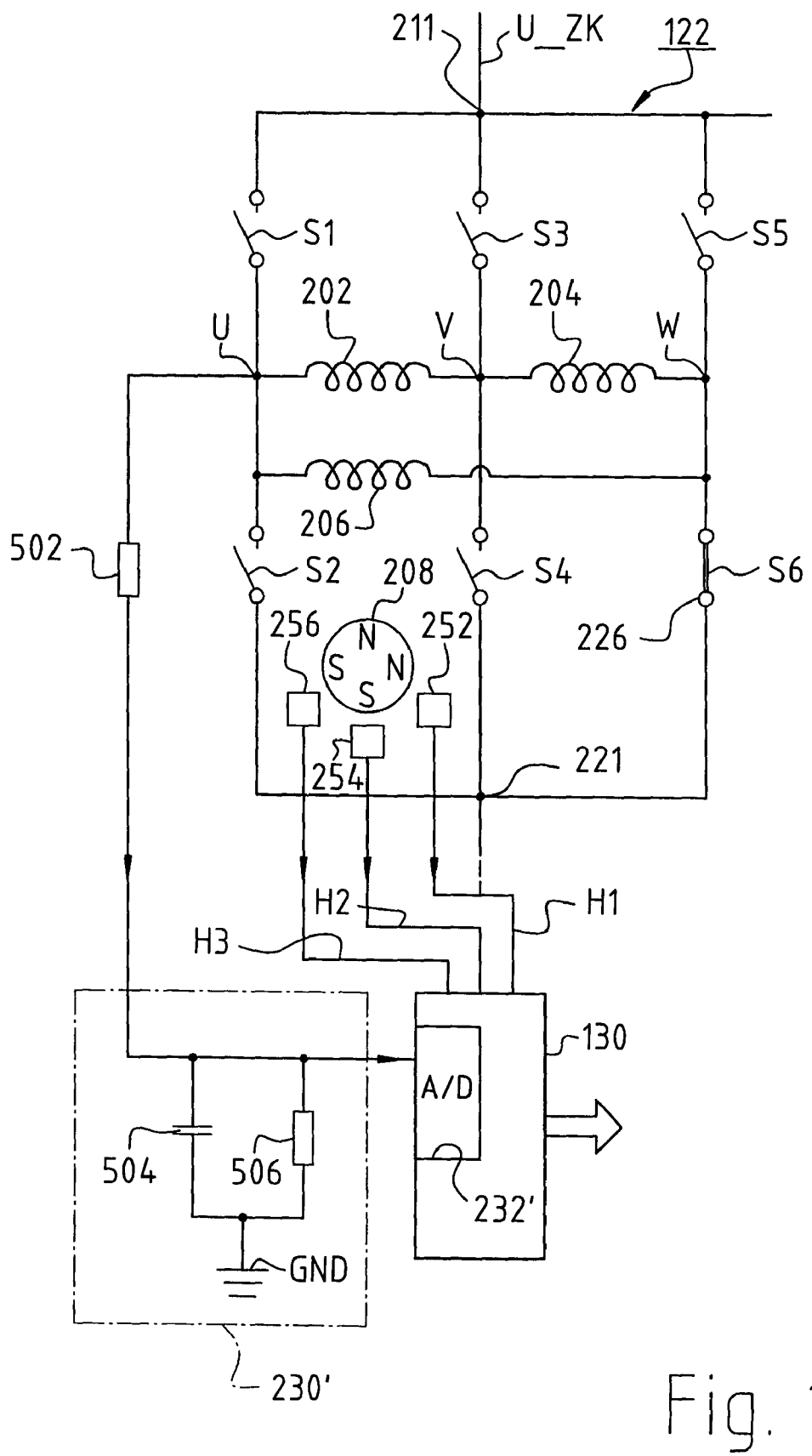
FIG. 11 is a simplified circuit for sensing the voltage that is induced in stator phase 206, while the motor is currentless, by the rotation of rotor 208.

A simplification in FIG. 2 is possible by omitting two of the three measurement circuits 230', 230", 230'" for the measurement of $U_{IND}$, as depicted in FIG. 11, and by waiting for the occurrence of the correct combination of Hall signals for the beginning of a measurement.

The circuit according to FIG. 11 is based on the assumption that the induced voltage is measured at terminal U, while terminal W is connected during the measurement to node 221 via semiconductor switch S6. This corresponds to line 004 of Table 1, where H1=0, H2=1, and H3=1.

Since measurement occurs only in the presence of this condition, which exists twice per rotor revolution in a four-pole motor, in FIG. 11 components 502, 504, and 506, as well as a microcomputer 130 having only one A/D converter 232', are sufficient. The result is thus to simplify the hardware, since two A/D converters are eliminated. A more inexpensive microcomputer can therefore be used.

Figure 10:
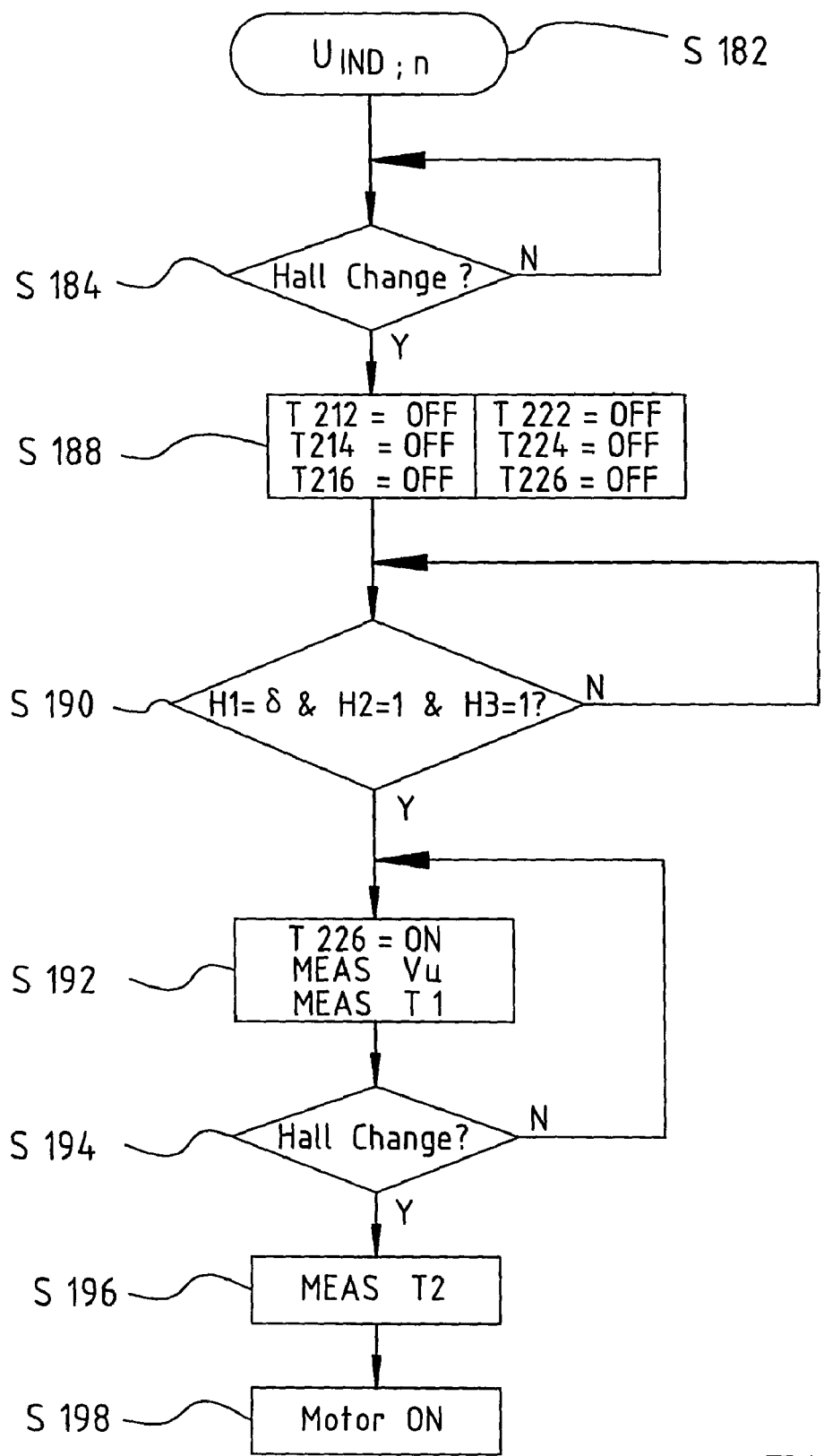
FIG. 10 is a flow chart showing sensing of the induced voltage in the arrangement depicted in FIG. 11.

FIG. 10 shows the associated flow chart. This routine begins with step S182, where a measurement of the induced voltage $U_{IND}$, and optionally also of the rotation speed n, is requested. This can occur, for example, every 30 minutes. At S184 the routine waits for the next change in one of the three Hall signals H1, H2, H3.

In step S188, power stage 122 is made currentless by the fact that all six semiconductor switches 212, 214, 216, 222, 224, 226 are made non-conductive.

The routine then waits at S190 until the Hall signal combination according to line 004 of Table 1 is present. If YES, then according to S192 semiconductor switch 226 is switched on, as depicted in FIG. 11, and the voltage at terminal U is measured until the next change in the Hall signals, i.e. over 60° el., as depicted in FIG. 7 (between rotational positions 710 and 720 of rotor 208 therein). The time T1 is measured at rotational position 710, and the time T2 at rotational position 720; in other words, the difference (T2-T1) corresponds to a 60°-el. rotation angle of rotor 208. The rotation speed of the rotor can be calculated therefrom, or the measured time (T2-T1) can be used directly for calculation.

When one of the three Hall signals changes in S194, the measurement is completed, time T2 is measured in S196, and in S198 motor 124 is switched back on, i.e. commutation once again occurs normally.

Because the measurement of the induced voltage is typically performed over less than one rotor revolution, this measurement has no substantial influence on the rotation speed of rotor 208, so that the rotation speed target value of a rotation speed regulator can also be used to calculate $U_{IND}/\omega$, provided ECM 124 is running at a regulated rotation speed.

Figure 12:
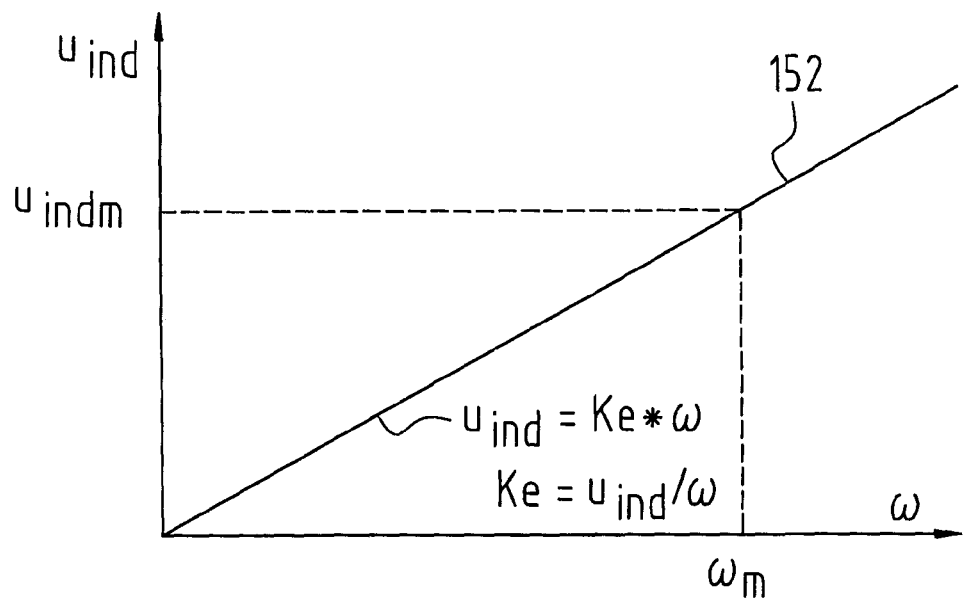
FIG. 12 is a diagram showing the correlation between the rotation speed omega ($\omega$) and the induced voltage $U_{IND}$ for a specific motor and a specific motor temperature.

When permanent-magnet rotor 208 in ECM 124 is mechanically driven, it induces in phases 202, 204, 206 an induced voltage $U_{IND}$ whose magnitude is directly proportional to the rotation speed $\omega$. This is depicted in FIG. 12. The relevant equation is $$U_{IND} = k_e * \omega \qquad (3)$$

This is the equation of line 152 in FIG. 12.

If a pair of values $U_{IND}$ and $\omega$ is known from a measurement, $k_e$ is then determined as $$k_e = U_{IND}/\omega \qquad (4),$$

as depicted in FIG. 10. The value $k_e$ is also referred to as the "motor constant."

In a series of identical motors, i.e. motors from the same production series, there are individual deviations in the motor constant. One of the reasons for this is that the permanent magnets of the rotors may exhibit deviations in their magnetic properties.

Figure 13:
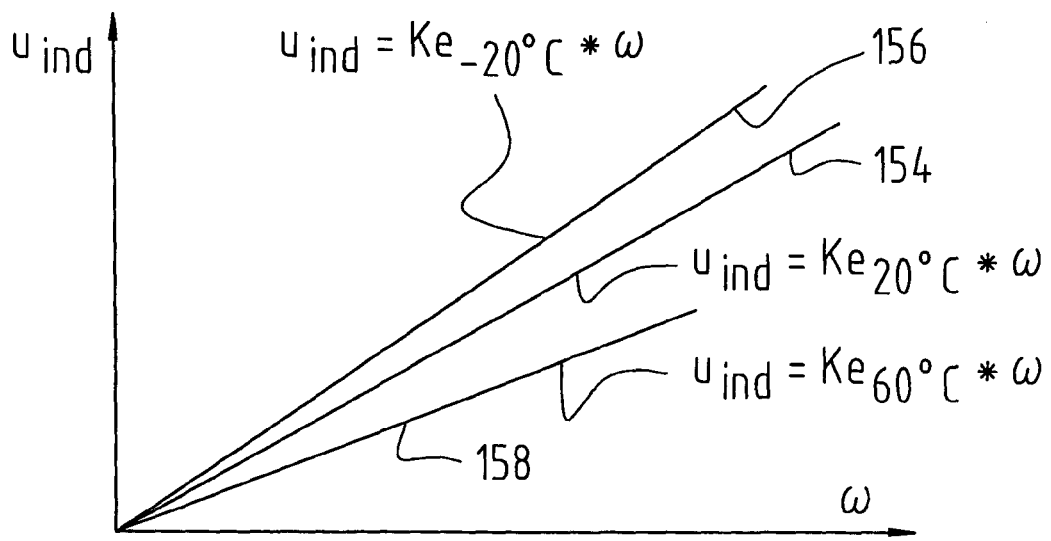
FIG. 13 is a diagram analogous to FIG. 12 that shows the correlation between rotation speed and induced voltage for the same motor at temperatures of −20° C., +20° C., and +60° C.; it is evident that, at a predetermined rotation speed, the induced voltage decreases with increasing motor temperature.

The motor constant is also dependent on temperature, i.e. it decreases with rising temperature. This is depicted in FIG. 13, where 154 represents the curve for the induced voltage at 20°. The shape of this is $$U_{IND}=k_{e20°\,C.}*\omega \quad (5)$$

The expression for the so-called angular frequency ω is $$\omega=n*2\pi/60(s^{-1}) \quad (6),$$

where n=the rotation speed in rpm.

EXAMPLE 1

If n=3000 rpm, then $$\omega=3000*2\pi/60=314/s \quad (7).$$

EXAMPLE 2

For a first motor, at 3000 rpm=314/s, an induced voltage of $U_{IND}$=5 V=5000 mV is measured.
Then $$k_{e1}=5000\ mVs/314=15.9\ mVs \quad (8).$$

EXAMPLE 3

For a second motor of the same type, at n=3000 rpm and the same temperature, a voltage of only $U_{IND}$=4.8 V=4800 mV is measured.
In this case $$k_{e2}=4800\ mVs/314=15.3\ mVs \quad (9).$$

The result for the second motor, according to equation (2), is a correction factor of $$Cf=k_{e1}/k_{e2}=15.9\ mVs/15.3\ mVs=1.04 \quad (10).$$

This means that the target value $I_s$ for limiting the motor current must be increased by 4% for the second motor, in order to obtain the same torque T as with the first motor.

A higher induced voltage occurs at lower temperatures because the magnetic flux density of rotor magnet 208 increases, and a curve 156 is therefore obtained at –20° C. At 60° C. a lower induced voltage is obtained, and its curve is labeled 158.

These different values of $k_e$ also have an influence on the motor's torque, which is defined as $$T=k_e*I_s \quad (11),$$

in which
T=torque generated by the motor for a current I;
$k_e$=instantaneous motor constant;
$I_s$=target value for the motor current.

Figure 14:
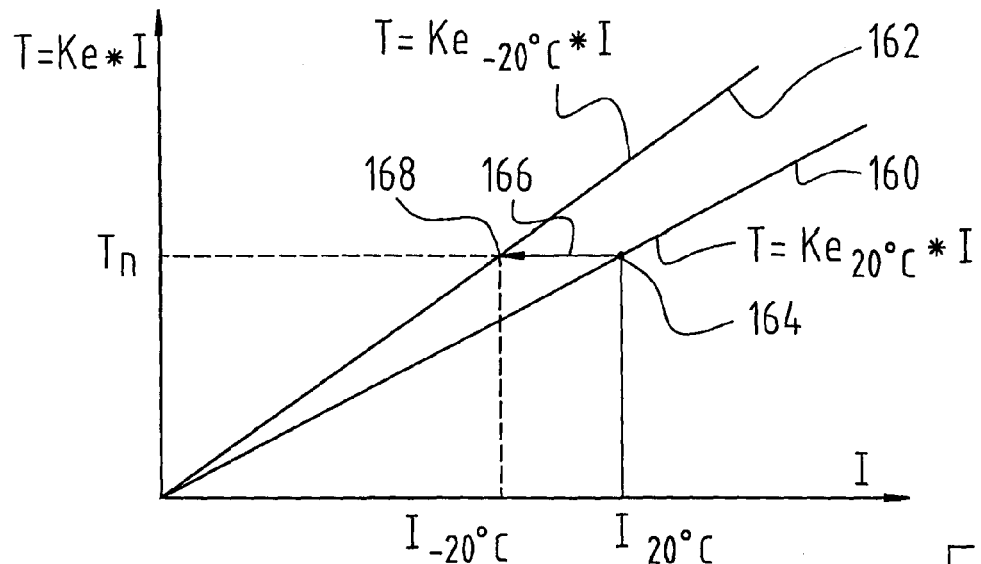
FIG. 14 is a diagram showing the correlation between the motor current I and torque T for the same motor but at different temperatures.

FIG. 14 shows, for a predetermined motor, a characteristic curve 160 describing the torque of a specific motor at 20° C. as a function of the current I. FIG. 14 also shows, for the same motor, a characteristic curve 162 for the torque T at –20° C., likewise as a function of current I.

It is apparent from these two curves that for a given current, the motor generates more torque at –20° C. than at +20° C.

This is undesirable because such motors serve, for example, to open and close valves, in which context a current limiting function must ensure that the maximum torque generated by ECM 124 does not become too high, since otherwise the valve could be damaged over the long term. This problem exists especially when such valves are used in Arctic regions. The same problem occurs in many actuating drive systems that must be functional at different temperatures.

For this reason, the value of the motor current to which that current is limited by the response of a current limiting system must be reduced at low temperatures, as depicted in FIG. 14; i.e. a horizontal line 166 is drawn, for example, from a working point 164 that is valid for 20° C. to curve 162, where a new working point 168 is determined for –20° C.

The procedure is analogous when the temperature rises, the purpose in this case being to increase the value of the current $I_s$ so that the torque T is maintained even at the higher temperature; in this case the current value $I_s$ must be increased. The current can easily be increased, in this context, by pulse width modulation.

Figure 15:
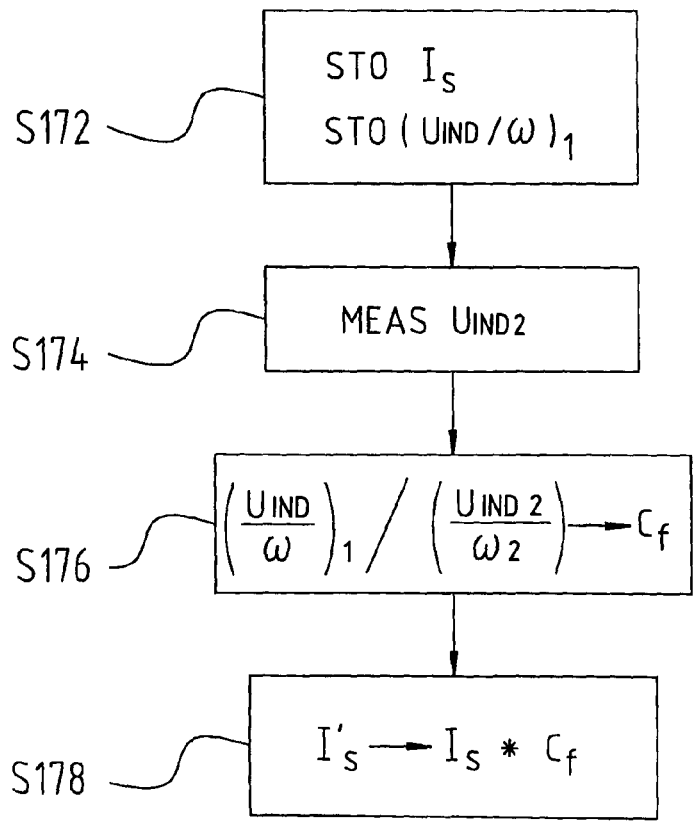
FIG. 15 is a flow chart designed to enable a specific motor to generate, by way of electronic actions, a torque of predetermined magnitude for a predetermined motor current Is, regardless of motor temperature.

FIG. 15 shows the associated flow chart. At S172 a current value $I_s$, which was measured at 20° C., is stored. This current $I_s$ is preferably the average of measurements on several motors, particularly preferably the value to which a current limiting system is to be set. Also at S172, a value $(U_{IND}/\omega)_1$, representing the average of measurements for a number of motors of a certain type at 20° C., is stored. This is therefore an optimized value, or the value, so to speak, for an optimum average production motor.

In step S174 the induced voltage $U_{IND2}$ is measured for the present motor, e.g. by means of steps 940, 950, and 960 of FIG. 9.

The value for the rotation speed ω is in most cases already available, since many ECMs today have a rotation speed regulation system; the target value $\omega_2$ of the rotation speed controller can therefore be used to calculate $U_{IND2}/\omega_2$. Alternatively, a value for the rotation speed can also be measured simultaneously with the measurement of the induced voltage, as already described.

In S176 a correction factor Cf is then calculated using the formula $$Cf=(U_{IND1}/\omega_1)/(U_{IND2}/\omega_2) \quad (12).$$

This correction factor takes into account two things:
a) the deviation of the motor from an "average" motor; and
b) the deviation caused by the fact that the motor is either colder or hotter than, for example, 20° C.

In S178, this correction factor Cf is multiplied by the current value $I_s$ stored in S172, i.e. if the motor is cold, the current value $I_s$ is reduced, and if the motor is hot, the current value $I_s$ is increased, so as to obtain in each case approximately the same torque T that would be generated by a prototype motor (having optimum properties) at the instantaneous temperature.

By way of this electronic correction, a motor according to the present invention thus acquires the same properties as a motor from the same production series having predetermined properties, i.e. the manufacturer can assure the purchaser of certain motor properties.

Many variants and modifications are of course possible, for one skilled in the art, within the scope of the present invention.

What is claimed is:
1. A method of ascertaining the value of a motor parameter of an electronically commutated motor during operation thereof, which motor has a stator with a plurality of stator phases and a permanent-magnet rotor coacting with that stator, which rotor induces alternating voltages ($U_{IND}$) in the stator phases during operation, a power stage for controlling energization of the stator phases being associated with those stator phases, said method comprising the steps of:

during motor operation, interrupting energy delivery to the motor, while the rotor continues to turn;

during this substantially currentless state, activating a measurement circuit, in the course of rotation of said rotor through a predetermined rotation range, for a predetermined phase at which the induced voltage reaches a maximum in that predetermined rotor rotation range;

with that measurement circuit, measuring the induced voltage, at the predetermined phase at least in the region of that predetermined rotor rotation range; and thereafter switching energy delivery to the motor back on.

2. The method according to claim 1, further comprising converting the measured induced voltage from an analog value into a digital value.

3. The method according to claim 1, further comprising, approximately in the vicinity of the time segment in which the induced voltage is measured, ascertaining a value corresponding to rotation speed of the rotor.

4. The method according to claim 3, further comprising, in chronological correlation with said measuring of the induced voltage ($U_{IND}$), ascertaining a time period (T2-T1) required by the rotor in order to travel through a predetermined rotation angle.

5. The method according to claim 3, further comprising, in order to ascertain a temperature-dependent motor parameter, computationally combining the measured induced voltage ($U_{IND}$) with a value characteristic of the rotation speed.

6. The method according to claim 5, further comprising using that temperature-dependent motor parameter, correcting aa a function of motor temperature, a target value for current (I) applied to the motor, in order to associate with a predetermined current target value, and substantially independently of the temperature of the motor, a predetermined torque generated by the motor.

7. The method according to claim 1, further comprising, for an electronically commutated motor having three stator phases, the power stage for controlling the stator phases comprising three series circuits each having an upper and a lower semiconductor switch, and the terminals (U, V, W) of those stator phases each being connected to an associated series circuit, the steps of:

interrupting energy delivery to the stator phases by making the semiconductor switches non-conductive;

making conductive a first semiconductor switch of a first series circuit connected to a first winding terminal (U, V, W); and measuring, at a second winding terminal, which is connected via a stator phase to the first winding terminal and with which a second series circuit is associated, the voltage induced in the relevant stator phase.

8. The method according to claim 7, further comprising, in order to ascertain the value of a temperature-dependent motor parameter, selecting the first and the second series circuit as a function of the rotor position.

9. The method according to claim 7, further comprising, in order to ascertain the value of a temperature-dependent motor parameter, selecting the first and the second series circuit by means of a stored table.

10. The method according to claim 1, further comprising, subsequent to an end of the measuring period, commutating normally a motor power stage, in order to control energy delivery to the stator phases.

11. A method of ascertaining a temperature-dependent motor parameter of an electronically commutated motor during operation, which motor comprises a stator having a plurality of stator phases and a permanent-magnet rotor coacting with that stator, which rotor induces voltages ($U_{IND}$) in the stator phases during operation, a power stage for controlling the energization of the stator phases being associated with those stator phases, comprising the steps of:

a) while the motor is running, interrupting energization of the stator phases;

b) ascertaining a value ($U_{IND}$) that characterizes a voltage induced in a stator phase by the permanent-magnet rotor;

c) ascertaining a value (T2-T1; ω) characterizing rotation speed of the motor;

d) with the aid of said ascertained values, deriving the value of the temperature-dependent motor parameter.

12. The method according to claim 11, further comprising using said derived value of the temperature-dependent motor parameter to infer the temperature of the magnet of the electronically commutated motor.

13. The method according to claim 11, further comprising influencing permitted values of motor current as a function of the temperature-dependent motor parameter.

14. The method according to claim 11, further comprising after energization is interrupted and before measurement begins, waiting for a predetermined time period to elapse, in order to allow the motor current to decay.

15. The method according to claim 11, further comprising monitoring levels of motor current for a period of time after energization is interrupted, in order to detect a point in time of a transition, of a motor winding, into a currentless state.

16. The method according to claim 11, further comprising measuring a time period (T2-T1), required by the rotor of the motor in order to rotate from a first predetermined position to a second predetermined position.

17. The method according to claim 16, wherein the motor has, associated with it, a rotor position sensor arrangement for generating at least one rotor position signal (H1, H2, H3); and further comprising using rotor position signals from said sensor arrangement to detect when said rotor reaches said first and the second predetermined positions.

18. The method according to claim 17, further comprising detecting the first and the second positions by a respective change in the rotor position signal.

19. The method according to claim 17, further comprising defining, as a measurement period for measurement of a value characterizing the induced voltage, the period between a first change of a rotor position signal and a second change of a rotor position signal.

20. The method according to claim 11, further comprising measuring a plurality of times during the measurement period, and calculating the value characterizing the induced voltage by averaging results of said measurements.

21. The method according to claim 11, further comprising, for an electronically commutated motor having three stator phases, the power stage for controlling the stator phases comprising three series circuits each having an upper and a lower semiconductor switch, and the terminals (U, V, W) of those stator phases, each being connected to an associated series circuit, the steps of:

interrupting energy delivery to the stator phases by making the semiconductor switches non-conductive;

making conductive a first semiconductor switch of a first series circuit that is connected to a first winding terminal (U, V, W);

measuring, at a second winding terminal, which is connected via a stator phase to the first winding terminal and with which is associated a second series circuit whose semiconductor switches have been made non-conductive, the voltage induced in the relevant stator phase.

22. The method according to claim 21, further comprising selecting said first and second series circuits as a function of rotor position, in order to ascertain the value of the temperature-dependent motor parameter.

23. The method according to claim 21, further comprising selecting said first and the second series circuit by means of a stored table, in order to ascertain the value of the temperature-dependent motor parameter.

24. The method according to claim 11, further comprising, after an end of the measurement period, commutating normally the power stage, in order to once again deliver energy to the motor.

25. The method according to claim 11, further comprising using, as the temperature-dependent motor parameter, a value which is a quotient of a value ($U_{IND}$) characterizing the induced voltage at the relevant temperature, and a value ω characterizing the rotation speed.

26. The method according to claim 25, further comprising determining a nominal value ($k_{eNOM}$) for the temperature-dependent motor constant ($k_e$), which value describes the temperature-dependent motor constant ($k_e$) at a predetermined magnet temperature.

27. The method according to claim 26, wherein said nominal-value-determining step comprises dividing the temperature-dependent motor constant ($k_e$) by the nominal value ($k_{eNOM}$), and thereafter correcting the motor current, using that correction factor, as a function of the magnet temperature of the motor.

28. The method according to claim 11, further comprising regulating the rotation speed to a target value, and using said target value as the value characterizing the rotation speed.

29. The method according to claim 11, further comprising ascertaining, from the temperature-dependent motor parameter, a maximum motor current corresponding to a predetermined torque; and limiting the motor current to that maximum motor current, in order to limit the torque generated by the motor.

30. An electronically commutated motor comprising:

a stator having a plurality of stator phases;

a permanent-magnet rotor, coacting with that stator, which, during operation, induces voltages in the stator phases;

a power stage associated with the stator phases in order to influence their energization, and a control arrangement which is configured to ascertain the value of a temperature-dependent motor parameter by the steps of:

a) while the motor is running, interrupting energization of the stator phases;

b) ascertaining a value ($U_{IND}$) characterizing an induced voltage;

c) ascertaining a value (ω) characterizing the rotation speed of the motor; and d) deriving, from said ascertained values ($U_{IND}$, ω), the value of said temperature-dependent motor parameter ($k_e$).

31. A method of operating an electronically commutated motor having a stator with a plurality of stator phases and a permanent-magnet rotor coacting with that stator, which rotor induces voltages ($U_{IND}$) in the stator phases during operation, a power stage being associated with the stator phases in order to control energization of those stator phases, comprising the steps of:

applying, to the motor, a control signal which is a first quotient of an induced voltage ($U_{IND}$) and a value characterizing the rotation speed of the motor;

applying to the motor, as a limit value for motor current, a value ($I_s$) of the motor current that is known to bring about a desired torque output from the motor;

briefly making the motor at least substantially currentless;

ascertaining, from an induced voltage ($U_{IND}$) sensed in that at least substantially currentless state, and from a rotation speed value that at least substantially reflects the instantaneous rotation speed of the motor, a second quotient of the induced voltage and rotation speed; and if the value of the second quotient deviates from the value of the first quotient, converting the predetermined value ($I_s$) of the current into a corrected value ($I'_s$), based on a correction factor ratio between the first and the second quotient, in order to obtain at least approximately the desired torque.

* * * * *

UNITED STATES PATENT AND TRADEMARK OFFICE
CERTIFICATE OF CORRECTION

PATENT NO. : 7,319,300 B2  Page 1 of 1
APPLICATION NO. : 11/420213
DATED : January 15, 2008
INVENTOR(S) : Hahn It is certified that error appears in the above-identified patent and that said Letters Patent is hereby corrected as shown below:

Title Page; item (54);
1. On patent cover, in the title, second occurrence of "METHOD" should be --MOTOR--
2. In column 3, line 1, "depeedent" should be --dependent--
3. In column 15, line 37, claim 6, line 3 "aa" should be --as--

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,319,300 B2  Page 1 of 1
APPLICATION NO. : 11/420213
DATED : January 15, 2008
INVENTOR(S) : Hahn It is certified that error appears in the above-identified patent and that said Letters Patent is hereby corrected as shown below:

Title Page; item (54) and Column 1, line 3;
1. On patent cover, in the title, second occurrence of "METHOD" should be --MOTOR--
2. In column 3, line 1, "depeedent" should be --dependent--
3. In column 15, line 37, claim 6, line 3 "aa" should be --as--

This certificate supersedes the Certificate of Correction issued August 19, 2008.

Signed and Sealed this

Sixteenth Day of September, 2008

JON W. DUDAS
*Director of the United States Patent and Trademark Office*